United States Patent [19]

Bertling et al.

[11] Patent Number: 5,301,504
[45] Date of Patent: Apr. 12, 1994

[54] COMBINATION VALVE

[75] Inventors: Johannes-Gerhard Bertling, Vaihingen/Enz; Claudius Muschelknautz, Lauf, both of Fed. Rep. of Germany

[73] Assignee: Robert Bosch GmbH, Stuttgart, Fed. Rep. of Germany

[21] Appl. No.: 14,381

[22] Filed: Feb. 5, 1993

[30] Foreign Application Priority Data

Feb. 14, 1992 [DE] Fed. Rep. of Germany ....... 4204415

[51] Int. Cl.⁵ .......................... F01N 3/22; F16K 31/12
[52] U.S. Cl. ........................................ 60/307; 60/293; 137/506; 137/512.15; 137/614.2; 137/854
[58] Field of Search ................... 60/293, 307; 137/506, 137/614.2, 854, 512.15

[56] References Cited

U.S. PATENT DOCUMENTS

| | | | |
|---|---|---|---|
| 666,145 | 1/1901 | Kennedy | 137/512.15 |
| 3,788,071 | 1/1974 | Brewer | 60/293 |
| 3,871,175 | 3/1975 | Yamamoto | 60/307 |
| 3,969,041 | 7/1976 | Thausing | 137/854 |
| 4,064,693 | 12/1977 | Shibata | 60/293 |
| 4,574,835 | 3/1986 | Williams | 137/854 |
| 4,630,642 | 12/1986 | Detweiler | 137/614.2 |

Primary Examiner—Douglas Hart
Attorney, Agent, or Firm—Michael J. Striker

[57] ABSTRACT

A combination valve assembly, particularly for a secondary air blower in internal combustion engines with controlled three-way catalyzer, the combination valve assembly comprises a valve housing having a valve inlet and a valve outlet, a pneumatically actuated valve arranged in the valve housing and having a valve member for locking and releasing a flow path between the valve inlet and the valve outlet, a return valve arranged in the housing downstream of the by-pass valve as considered in a flow direction and having a closing member formed as a leaf spring, a valve plate provided with openings and a stroke catcher limiting an opening stroke arranged so that the leaf spring located between the valve plate and the stroke catcher, a valve closing spring loading the valve member of the valve in a valve closing direction while a differential pressure between a valve inlet pressure and a surrounding pressure loads the valve member of the valve in a valve opening direction. The leaf spring of the return valve has spiral arms formed in it and is clamped between the valve plate and the stroke catcher.

12 Claims, 2 Drawing Sheets

COMBINATION VALVE

BACKGROUND OF THE INVENTION

The present invention relates to a combination valve and particularly for secondary air blower in internal combustion engines with controlled three-way catalyzer.

Such combination valves or combivalves which are provided in a valve housing with a by-pass and return valve serve for switching off of the secondary air stream from the exhaust gas pipe of internal combustion engines with controlled three-way catalyzer. A blower, so-called secondary air blower supplies fresh air to the exhaust gas jet of the internal combustion engine as far as possible before the catalyst, for adjusting a post-burning of the exhaust gas at temperatures of above 600° C. operation. With this post-burning the carbon compounds contained in the exhaust gas as well as the carbon monoxide are reduced. Moreover, by the post burning heat is supplied to the catalyzer, and therefore it is specially important for the cold start.

During the operation of the secondary air blower the by-pass valve is open and the secondary air after flowing through the open return valve is blown into the waste gas pipe of the internal combustion engine. The return valve has the function of reducing a return stream of the exhaust gas through the blower during the pressure increase in the waste gas pipe. The by-pass valve prevents suction of the secondary air caused by the pressure pulsation during stoppages of the secondary air blower.

In a known combivalve of the above mentioned general type the actuation of the by-pass valve is performed by the suction pipe negative pressure in the internal combustion engine and the control is executed by an external magnetic valve. The valve member is held in an open position by a valve spring prestressed in an opening direction, and closes when a predetermined suction pipe negative pressure is reached. The closing member of the return valve is formed as a full leaf spring which is inserted at the side of the edge between a valve plate with openings and a stroke catcher.

SUMMARY OF THE INVENTION

Accordingly, it is an object of the present invention to provide a combination valve of the above mentioned general type, which has the advantage in that the valve is actuated from a system pressure and not from a control pressure derived from the internal combustion engine.

In keeping with these objects and with others which will become apparent hereinafter, one feature of the present invention resides, briefly stated, in a combination valve in which the valve member of the valve is loaded in a valve closing direction by a valve closing spring and in a valve opening direction by a differential pressure between a valve inlet pressure and a surrounding pressure, and the leaf spring of the valve has spiral arms produced by cutting from it and tensioned centrally between a valve plate and a stroke catcher.

When the combination valve is designed in accordance with the present invention, the valve is controlled not by a control pressure derived from the internal combustion engine but is controlled by a system pressure. Therefore, a magnetic valve as well as electrical and pneumatic connections and connection conduits of a known combination valve can be dispensed with.

Since in accordance with the present invention the leaf spring of the return valve has punched-out spiral arms, the leaf spring has only a low restoring force and therefore low pressure losses during a throughflow of the combination valve occur. Since the spiral leaf spring has a low mass of inertia, a fast reaction of the return valve is guaranteed.

Summarizing the above, it should be emphasized that when the combination valve is designed in accordance with the present invention, it is cost-favorable with regard to its manufacture and mounting, and satisfies the requirements of low pressure loss.

In accordance with a preferable embodiment of the invention the valve housing is composed of two parts and includes a housing cup with an air inlet arranged in the cup wall and a coaxially arranged air outlet, and a housing cover which closes the cup opening and is provided with a ventilating opening. The rear side of the valve plate carries a valve seat for the valve member of the valve, and the valve member is formed by a shaped membrane. The membrane is clamped in the valve housing at its edge between the housing cup and the housing cover, and a supporting piston is engaged by a valve closing spring which is supported on the housing cover. Such a combination valve has a valve housing of a simple shape, which can be produced easily and in a cost-favorable manner. It also provides for a good access for inserting and fixing the individual valve elements in the interior of the housing so that assembly of the combination valve can be performed in a time-economical manner.

In accordance with an alternative embodiment of the present invention, the valve housing is formed of three parts and has a funnel shaped housing lower part with a coaxially arranged air outlet, a housing intermediate part with a radially arranged air inlet, and a housing cover. The housing intermediate part has a lower housing cup which is closed by the housing lower part and an upper housing cup which is closed by the housing cover. The valve plate of the return valve is clamped between the lower housing cup and the funnel shaped housing lower part. The cup bottom of the lower housing cup is provided with a valve opening which is surrounded by a valve seat, and the valve member of the valve which is formed as a valve disc cooperates with the valve opening. The valve closing spring is supported between the valve disc and the valve plate.

The valve disc is connected with a control member through a valve rod, while the control member is inserted in the upper housing cup of the housing intermediate part. The cup portion limited by the housing cover and the control member is connected with the valve inlet by a housing opening. The cup portion limited by the cup bottom and the control member is connected with the atmosphere through an opening provided in the cup bottom. The thusly formed combination valve has the advantage of the redundancy of the valve and the return valve. When the latter breaks down, for example, due to the breakage of the spiral leaf spring, the which is closed during the turned off secondary air blower, seals with increasing waste gas pressure in the waste gas pipe of the internal combustion machine and thereby is self-reinforced at the valve outlet.

The novel features which are considered as characteristic for the invention are set forth in particular in the appended claims. The invention itself, however, both as

DESCRIPTION OF THE PREFERRED EMBODIMENTS

Figure 1:
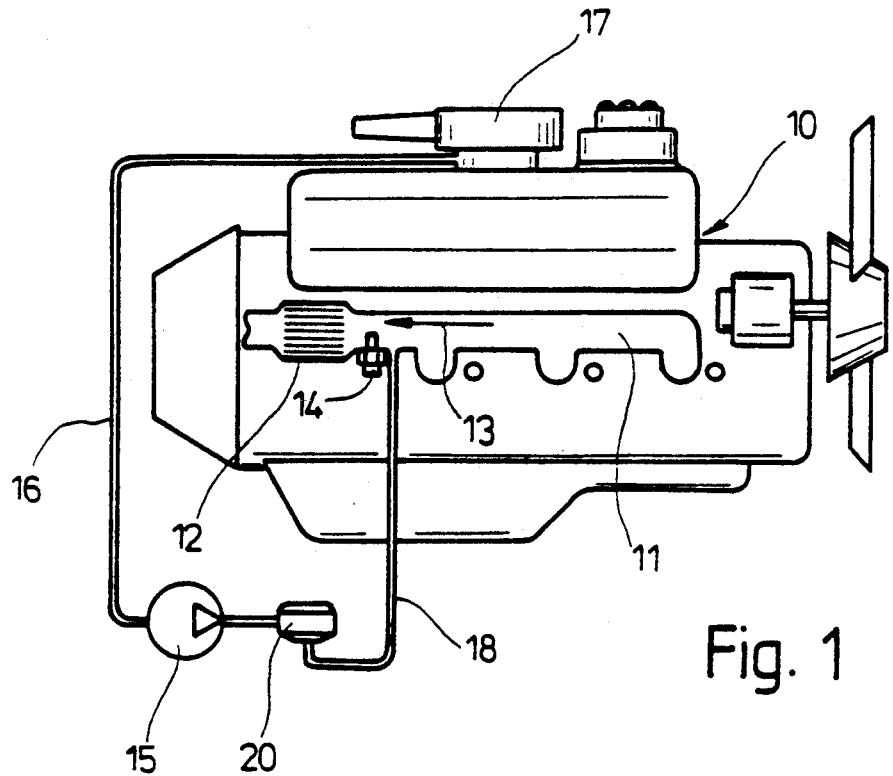
FIG. 1 is a view showing a principle diagram of the internal combustion engine with a controlled three-way catalyzer, a secondary air blower, and a combination valve provided in its pressure conduit.

An internal combustion engine which is identified in FIG. 1 with reference numeral 10 and provided for a motor vehicle has an exhaust gas pipe 11 with a controlled three-way catalyzer 12. The exhaust flows in direction of arrow 13 in FIG. 1. A so-called lambda probe 14 is arranged before the catalyzer 12 in the flow direction of the exhaust gas. A secondary air blower 15 is connected with the fresh air supply for the internal combustion engine 10 through a suction conduit 16 and in particular with an output of an air filter 17. A pressure conduit 18 leads from the blower 15 to the exhaust gas pipe 11. It opens before the catalyzer 12 as considered in the flow direction of the exhaust gas identified with the arrow 13. A so-called combination or combivalve 12 is arranged in the pressure conduit 18. On the one hand it prevents the return flow of the exhaust gas through the blower 15 during the pressure increase in the exhaust gas pipe and on the other hand it prevents an aspiration of the secondary air caused by pressure pulsation during stoppage of the blower 15.

Figure 2:
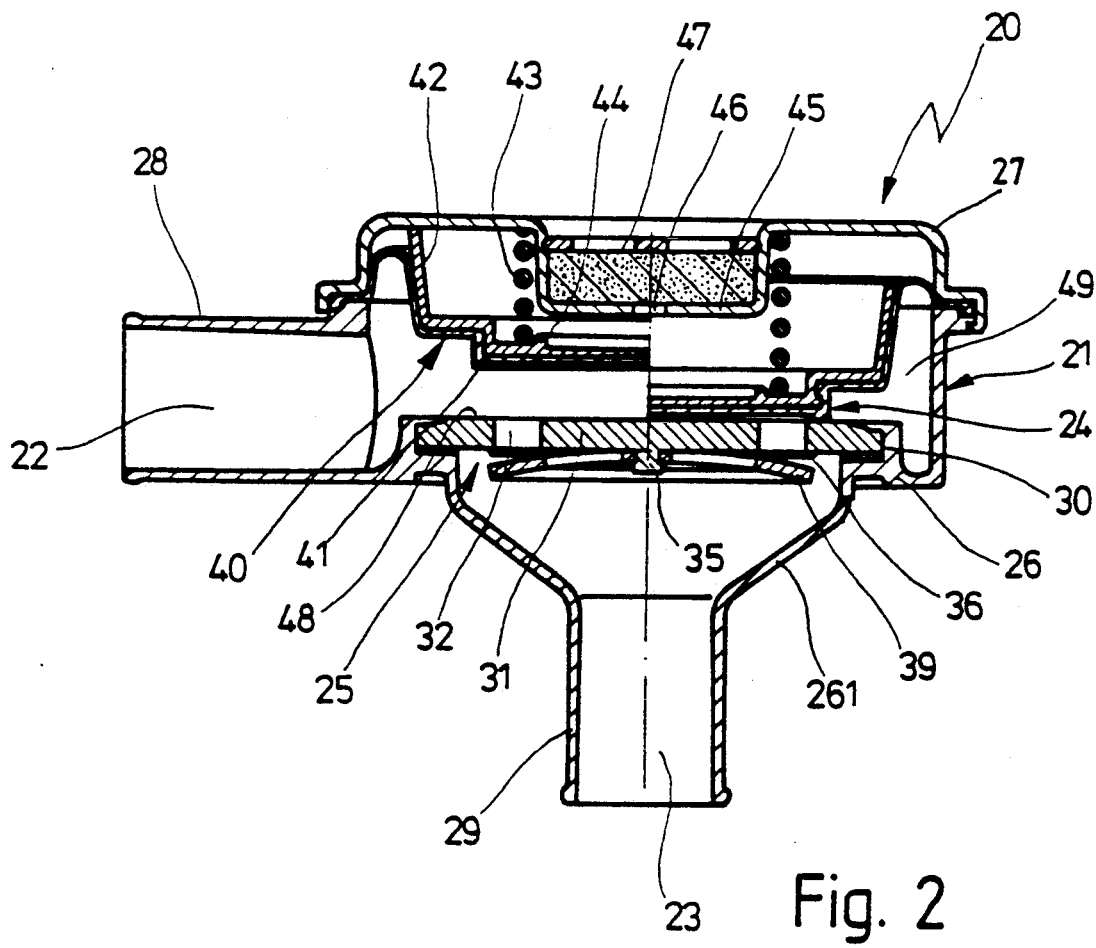
FIG. 2 is a longitudinal section of the combination valve shown in FIG. 1.
Figure 3:
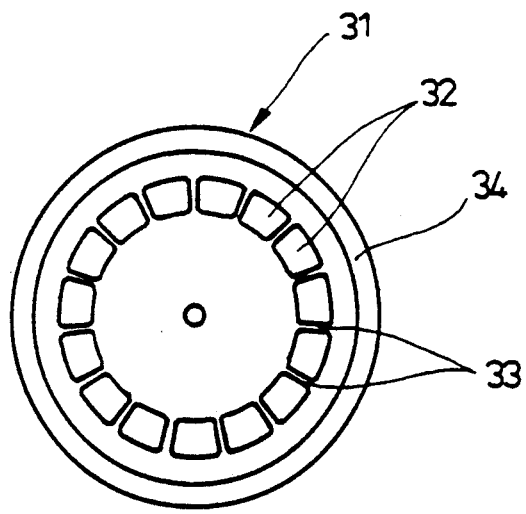
FIG. 3 is a plan view of a valve plate of the combination valve of FIG. 2.

As can be seen from the diagram of FIG. 2, a pneumatically actuated valve 24 and a return valve 25 are provided in a valve housing 21 which has a valve inlet 22 and a valve outlet 23. In particular, the valve 24 and the return valve 25 are arranged one behind the other from the valve inlet 22 to the valve inlet 23 as considered in the flow direction. The valve housing 21 is composed of two parts and has a housing cup 26 with a funnel-shaped cup body 261 and a housing cover 27 which closes the cup opening of the housing cup 26. The valve inlet 22 is arranged radially of the housing cup 26 and closed by a radially extending connecting pipe 28 which is formed of one piece with it. The funnel-shaped cup bottom 261 is formed at an end side with a coaxial connecting pipe 29 which surrounds the valve outlet 23. A ring-shaped receptacle 30 is provided on the upper funnel edge of the funnel-shaped cup bottom 261. A valve plate 31 is inserted with its edge in the receptacle 30 and fixed by flanging of the funnel edge. The valve plate 31 is shown in a plan view in FIG. 3. It has a plurality of openings 32 which are arranged on a circle so that only small material webs 33 remain between them. The valve plate 31 on the upper side is provided at its edge with a chamfer 34 which is engages the flanged funnel edge. At the opposite side the valve plate 31 has a coaxial receiving pin 35 shown in FIG. 2.

Figure 4:
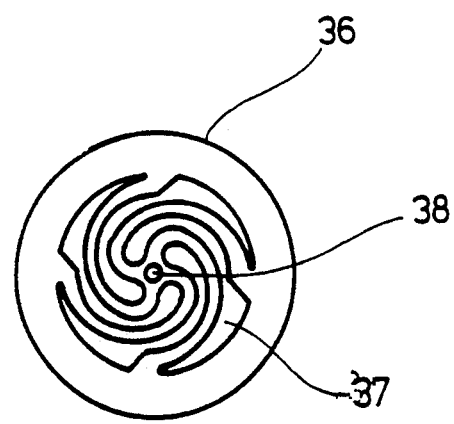
FIG. 4 is a plan view of a spiral leaf spring which forms a valve closing member in a return valve of the combination valve of the invention.

The return valve 25 has a valve closing member cooperating with the opening 32 in the valve plate 31. It is formed as a circular leaf spring 36. In FIG. 4 the leaf spring 36 is shown on a plan view. A plurality of spiral arms 37 are cut out in it and a fitting opening 38 is punched out. The leaf spring 36 is fixed with the fitting opening 38 on the receiving pin 35 of the valve plate 31 and is centrally clamped by a stroke catcher 39 arranged on the receiving pin 35, with respect to the valve plate 31. The stroke catcher 39 has an arcuate cross-section and extends over the opening 32 in the valve plate 31 at a defined distance from the valve plate 31. This distance determines the maximum stroke which the leaf spring 36 can perform during raising of the air pressure in the valve inlet 22. The leaf spring 36 can be prestressed in the closing direction. It has a very low return force due to the construction of the spiral arms 37 so that during opening of the return spring 25 low pressure losses occur.

The valve 34 has a valve member 40 which cooperates with a valve seat 48 formed at the side of the side plate 31 which is opposite to the return valve 25, for opening and closing of the opening 32 in the valve plate 31 and thereby the combination valve cooperates. The valve member 40 is shown in the left half of the cross-section in FIG. 2 in an open condition and in the right half in the closed condition of the combination valve. It has a shape diaphragm 41 which coats a supporting piston 42 and is clamped between the cup edge of the housing cup 26 and the housing cover 27 at the edge. A valve closing spring 43 is supported on the supporting piston 42 and on the housing cover 27. It is formed as a helical pressure spring. The valve closing spring 41 is guided on the supporting piston 42 on an axial projecting ring web 44 and on the housing cover 27 on an inwardly projecting reversed portion 45 of the housing cover. An opening 46 is arranged at the bottom of the reverse portion 45. It produces a connection of the space enclosed by the housing cover 27 and the shaped diaphragm 41 with a surrounding area so that in atmospheric pressure always acts in this region of the valve housing 21. The opening 46 is covered with an air filter 47. The filter is inserted in the reverse portion 45 so as to completely fill it and fixed in this portion.

When the blower 15 is turned off, the shaped diaphragm 41 is arranged under the action of the valve closing spring 43 on the valve seat 48 on the valve plate 31 and seals the opening 32 of the valve plate 31 relative to the valve inlet 27. The leaf spring 36 of the return valve 25 seals with its edge region the opening 32 in the valve plate 31. Due to the stepped supporting piston 42, a ring chamber 49 is formed in the valve housing 21 and is connected with the valve inlet 22. The ring chamber is limited by the inner wall of the housing 21 and the shaped diaphragm 41.

When the blower 15 is turned on, the pressure in the valve inlet 22 increases. Due to the pressure difference before and after the shaped diaphragm 41, it is lifted from the valve seat 48 and the valve 24 opens. The surface of the shaped diaphragm 41 which is subjected to the differential pressure between the valve inlet pressure and the surrounding pressure is dimensioned so that the valve 24 completely opens at a differential pressure of approximately 20 mbar. This is selected from the consideration that the typical operational point of the blower 15 is at a pressure of approximately 80 mbar at the outlet pipe of the blower 15. The air pressure in the interior of the housing also lifts the leaf spring 36 of the return valve 25 from the opening 32 in the valve plate 31 and places it on the stroke catcher 39. The return valve 25 is therefore fully opened and air flows through the pressure conduit 18 into the exhaust gas pipe 11 of the internal combustion engine 10.

Figure 5:
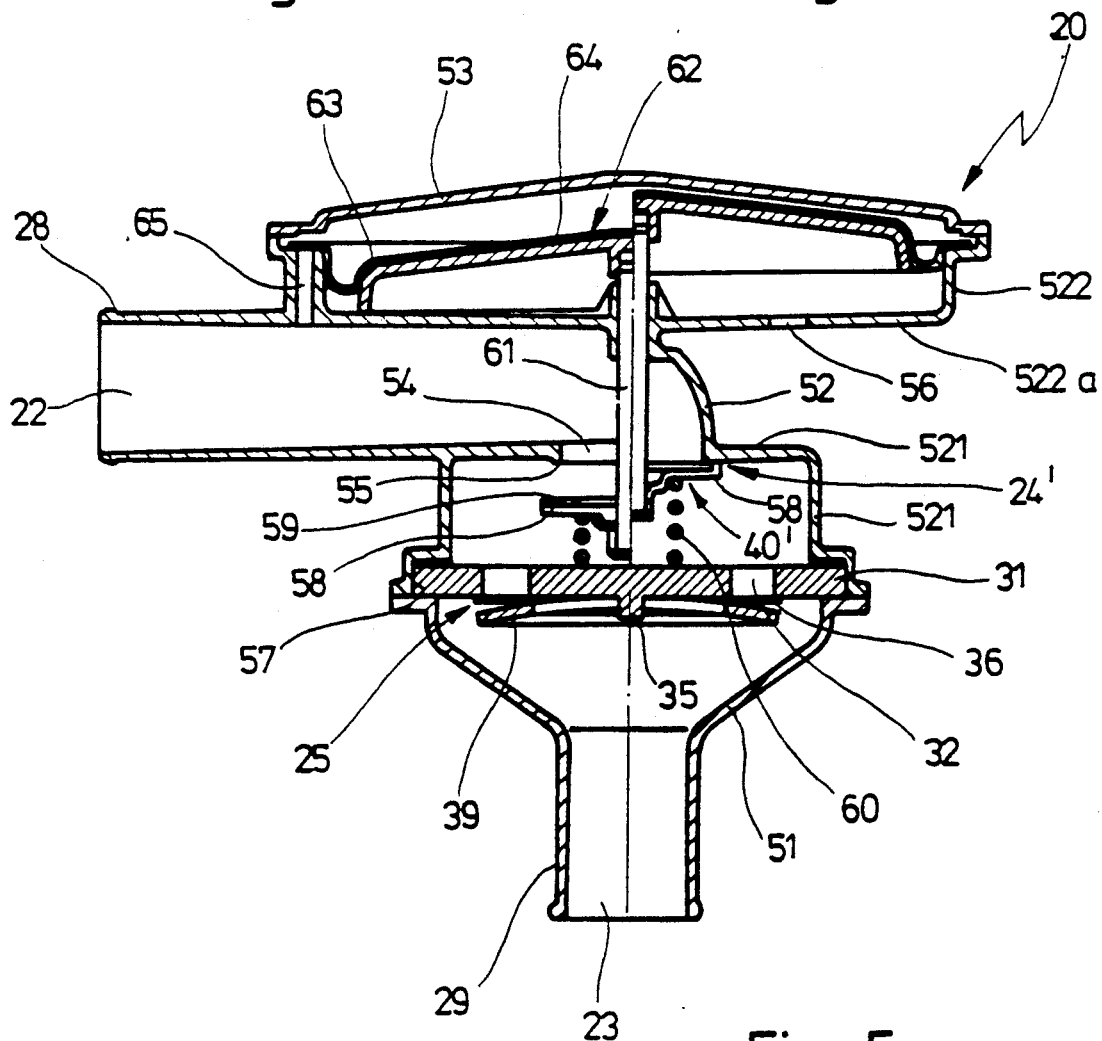
FIG. 5 is a view showing a longitudinal section of the combination valve in accordance with a further embodiment of the present invention.

FIG. 5 shows a further embodiment of a combination valve 20' in a longitudinal section, which can be used instead of the combination valve 20 in the pressure conduit 18 in FIG. 1. The combination valve 20' also has the valve 24' and the return valve 25 which are arranged in the above mentioned sequence one after the other from the valve inlet 22 to the valve outlet 23 in the flow direction. The return valve 25 corresponds in its construction and operation to the above described return valve, so that the same parts are identified with the same reference numerals. The valve housing 21' is however composed here of three parts. It has a funnel-shaped housing lower part 51 with the coaxially arranged valve outlet 23, a housing intermediate part 52 with radially arranged valve inlet 22, and a housing cover 53. The housing intermediate part 52 has a lower housing cup 521 which is closed by the housing lower part 51 and an upper housing cup which is closed by the housing cover 53. They are formed of one piece on the housing intermediate part 52. A valve opening 54 with a surrounding valve seat 55 is provided in the cup bottom 21a of the lower housing cup 521. An opening 56 is arranged in the cup bottom 522a of the upper housing cup 522 so that an air exchange can be performed through the opening 56 between the interior of the upper housing cup 522 and the surrounding area. The cup opening of the lower housing cup 521 is closed by the valve plate 31. The valve plate is inserted in a ring-shaped receptacle 57 formed in the cup edge and is clamped at the edge between the funnel shaped housing lower part 51 and the lower housing cup 521.

The valve opening 54 with the valve seat 55 is a part of the valve 24' which in the longitudinal section of FIG. 5 is shown in the open condition in the left half and in the closed condition in the right half. A valve member 40' of the valve 24' cooperates with the valve seat 55 and is formed as a valve disc 56 with the rubber coating 59. The closing position of the valve 24' is obtained by a valve closing spring 60 which is formed as a helical pressure spring and supported between the valve disc 58 and the valve plate 31. The valve disc 58 is fixedly connected with the control member 62 through a valve rod 61. The control member 62 is inserted in the upper housing cup 522 and acted by a differential pressure between the valve inlet pressure and the surrounding pressure in the opening direction of the by-pass valve 24'. The control member 52 is formed by a diaphragm 63 which covers a control piston 64 fixedly connected with the valve rod 61. The diaphragm is clamped at its edge between the cup edge of the upper housing cup 522 and the housing cover 533.

The housing cover 53 is fixed on the housing cup 522, for example is arrested in it. The portion of a space of the upper housing cup 522 enclosed between the diaphragm 63 and the housing cover 53 communicates through a housing opening 65 with the valve inlet 22 so that in this portion always the valve inlet pressure acts. In the portion of the space of the upper housing cup 522 which is limited by the cup bottom 522a and the diaphragm 63 always a surrounding pressure acts due to the opening 56 in the cup bottom 522a. The valve inlet 22 and the valve outlet 23 are also closed as in the combination valve 20 in FIG. 2 by the connecting pipes 28 and 29. The connecting pipe 28 is formed of one piece with the housing intermediate part 52 and extends radially from it, while the connecting pipe 29 is formed of one piece with the funnel-shaped housing lower part 51 and extends coaxially from the funnel end.

As in the combination valve 20 in FIG. 2, when the blower 15 is turned off both the valve 24' and the return valve 25 are closed. After turning on of the blower 15 the diaphragm 63 is pressed downwardly by the differential pressure between the valve inlet pressure and the surrounding pressure and lifts through the valve rod 61 of the valve disc 58 from the valve seat 55. Thereby the valve 24' opens, and the air flowing in the lower housing cup 521 opens the return valve 25 and flows through the valve outlet 23 and the pressure conduit 18 into the waste gas pipe 11. The surface of the diaphragm 63 and the spring force of the valve closing spring 60 are designed so that the valve 24' completely opens at a pressure difference of approximately 30 mbar and the valve closing spring 60 holds the valve disc 58 closed up to a negative pressure of approximately 500 mbar.

This combination valve 20' has the advantage that the valve 24' and the return valve 25 are redundant. In other words, in the event of a breakdown of the return valve 25, for example by breakage of the leaf spring 36, the valve 24' is closed and seals in a self-reinforcing manner with increasing waste gas pressure. What is disadvantageous when compared with the combination valve 20 of FIG. 1, is that this valve has a substantially greater structural volume and the more complicated housing shape of the valve housing 21'.

It will be understood that each of the elements described above, or two or more together, may also find a useful application in other types of constructions differing from the types described above.

While the invention has been illustrated and described as embodied in a combination valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A combination valve assembly, particularly for a secondary air blower in internal combustion engines with controlled three-way catalyzer, the combination valve assembly comprising a valve housing having a valve inlet and a valve outlet; a pneumatically actuated valve arranged in said valve housing and having a valve member for locking and releasing a flow path between said valve inlet and said valve outlet; a return valve arranged in said housing downstream of said valve as considered in a flow direction and having a closing member formed as a leaf spring; a valve plate provided with openings and a stroke catcher limiting an opening stroke arranged so that said leaf spring located between said valve plate and said stroke catcher; a valve closing spring loading said valve member of said valve in a valve closing direction while a differential pressure between a valve inlet pressure and a surrounding pressure loads said valve member of said valve in a valve opening direction, said leaf spring of said return valve having spiral arms formed in it and being clamped between said valve plate and said stroke catcher.

2. A combination valve as defined in claim 1, wherein said valve plate has a rear side which faces away from said leaf spring and carries a valve seat for said valve member of said valve.

3. A combination valve as defined in claim 1, wherein said valve member is formed as a shaped diaphragm which is clamped in a valve housing with its edge and coats and covers a support piston which engages said valve closing spring supported on a housing wall which is opposite to said valve plate.

4. A combination valve as defined in claim 1, wherein said valve housing is composed of two parts including a housing cup having a cup wall provided with said valve inlet arranged radially and with a cup bottom provided with said valve outlet arranged coaxially, and a housing cover which closes a cup opening of said housing cup and is provided with an air passage opening, said shaped diaphragm being clamped with its edge between said housing cup and said housing cover.

5. A combination valve as defined in claim 4, wherein said cup bottom of said housing cup is funnel-shaped and has an end which is shaped as a connecting pipe which surrounds said valve outlet and also has a funnel opening and a funnel edge, said valve plate being fixed to said funnel edge and covers said funnel opening of said cup bottom, said housing cup having a hollow cylindrical connecting pipe which extends radially from said cup wall and surrounds said valve inlet.

6. A combination valve as defined in claim 5, wherein said funnel edge of said housing cup has a ring shaped receptacle for said valve plate, said funnel edge being flanged so as to retain said valve plate in said receptacle.

7. A combination valve as defined in claim 4, wherein said housing cover has an inwardly projecting reverse portion having a bottom provided with an air inlet opening; and further comprising an air filter which closes said air inlet opening and is held in said reverse portion so as to completely fill the latter.

8. A combination valve as defined in claim 1, wherein said valve housing has a valve seat and a valve opening surrounded by said valve seat and provided between said valve inlet and said valve plate, said valve member of said valve which cooperates with said valve seat being formed as a valve plate which engages said valve closing spring supported on said valve plate, said valve plate having a valve rod; and further comprising a control member with which said valve rod of said valve plate is fixedly connected; and means forming a control chamber, said control member subdividing said control chamber into a first portion connected with said valve inlet and a second portion connected with a surrounding area.

9. A combination valve as defined in claim 8, wherein said control member is formed as a diaphragm which has an edge clamped in said valve housing, said valve rod having a control piston which is fixedly connected with said valve rod and is covered by said diaphragm.

10. A combination valve as defined in claim 8, wherein said valve housing has three parts including a funnel-shaped housing lower part provided with said coaxially arranged valve outlet, a housing intermediate part provided with said radially arranged valve inlet, and a housing cover, said housing intermediate part having a housing cup which is covered by said housing lower part and being provided with a cup bottom in which said valve opening with said valve seat is arranged, said housing intermediate part also having an upper housing cup in which said control member is arranged, said control member and said housing cover limiting a cup portion which communicates with said valve inlet through an opening, said cup bottom of said upper housing cup having an outwardly extending opening.

11. A combination valve as defined in claim 10; and further comprising a diaphragm which has an edge clamped between a cup edge of said upper housing cup and said housing cover.

12. A combination valve as defined in claim 10, wherein said funnel-shaped housing lower part has a first connecting pipe formed of one-piece with it and enclosing said valve outlet, said housing intermediate part having an air outlet located between cup bottoms of said lower and upper housing cups, said housing lower part having a connecting pipe which is formed of one piece with said housing lower part and surrounding said air inlet, said second connecting pipe projecting radially from said housing central part.

* * * * *